United States Patent [19]

Nagafuchi

[11] Patent Number: 4,772,512

[45] Date of Patent: Sep. 20, 1988

[54] COMPOSITE FILM FOR BAR CODE LABELS

[75] Inventor: Kazumasa Nagafuchi, Hyogo, Japan

[73] Assignee: Kisokaseisangyou Co., Ltd., Osaka, Japan

[21] Appl. No.: 14,629

[22] Filed: Feb. 12, 1987

[30] Foreign Application Priority Data

Jul. 29, 1986 [JP] Japan .................. 61-117334

[51] Int. Cl.[4] .......... A44C 3/00; C09U 7/02; C09J 7/02; A61F 13/02
[52] U.S. Cl. ................. 428/331; 428/40; 428/343; 428/351; 428/352; 40/637; 40/638; 40/630
[58] Field of Search .......... 428/351, 352, 343, 40, 428/331; 40/2 R, 2 G, 630

[56] References Cited

U.S. PATENT DOCUMENTS

| 3,519,525 | 7/1970 | Jackstadt | 428/351 X |
| 4,074,000 | 2/1978 | Hankee et al. | 428/352 X |
| 4,428,134 | 1/1984 | Arnold et al. | 40/2 R |
| 4,517,044 | 5/1985 | Arnold | 428/352 X |
| 4,526,405 | 7/1985 | Hattemer | 40/630 X |
| 4,585,254 | 4/1986 | Adams | 40/2 R X |

FOREIGN PATENT DOCUMENTS 1930517  5/1971  Fed. Rep. of Germany ....... 40/2 G

Primary Examiner—George F. Lesmes
Assistant Examiner—D. R. Zirker
Attorney, Agent, or Firm—John F. A. Earley; John F. A. Earley, III

[57] ABSTRACT

A composite film for bar code labels comprising first and second heat-resisting non-water-absorbing synthetic resin films. On the first film of the composite film bar code can be reproduced by means of a high speed dry process electrostatic copier.

8 Claims, 1 Drawing Sheet

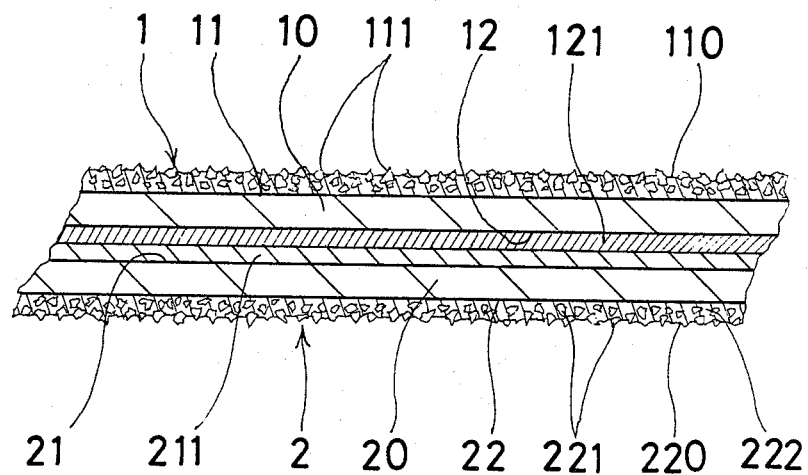

COMPOSITE FILM FOR BAR CODE LABELS

This invention relates to a composite film to be used for making bar code labels.

Formerly, bar code labels comprise a first paper which has been printed with bar code on its surface by offset process, and which is coated with an adhesive on its back, and a second paper attached to the back of the first paper. In use, the first paper is affixed to goods at its back after having been released from the second paper. However, when the bar code printed on the surface of the first paper is recognized by means of an optical mark reader, the surface of the first paper wears away after seventy or eighty times of recognition. As a result, the bar code becomes indistinct and it can't be recognized easily. Furthermore, when the surface of the first paper is covered with dust, it is hard to clean the surface and it is feared that mark recognition of the optical mark reader becomes hard. Besides, when the first paper has been affixed to out door goods or exports, the first paper absorbs humidity and printing condition of the bar code becomes deteriorated. As a result, it is feared that mark recognition of the optical mark reader becomes hard.

Furthermore, when the bar code is reproduced on conventional papers to be used for making bar code labels by means of a high speed dry process electrostatic copier, in which a specimen of the bar code is mounted, the papers are frequently sent out as two or more than two papers being superposed, and toner is badly fixed on the papers. Accordingly, when the bar code which is formed with the toner has been recognized several times by means of the optical mark reader, the toner is removed from the papers, and as a result, mark recognition of the optical mark reader becomes hard. In addition, when the bar code is reproduced on the conventional papers, the papers are bent owing to heat shrinkage. Accordingly, it becomes difficult for the first paper to be released from the second paper, and it also becomes difficult for the first paper to be affixed onto goods.

An object of the present invention is to provide a composite film to be used for making bar code labels which are capable of being recognized effectively by means of an optical mark reader after the labels have been recognized more than three hundred times, and which are capable of being used semipermanently.

Another object of the invention is to provide a composite film to be used for making bar code labels which are capable of being cleaned easily with water when the labels are covered with dust, and which are capable of being recognized effectively by means of the optical mark reader even when the labels have been used for outdoor goods or exports, because the labels do not absorb moisture.

Another object of the invention is to provide a composite film on which bar code can be reproduced easily by means of a high speed dry process electrostatic copier, said bar code being capable of being recognized by means of an optical mark reader for a long time.

In accordance with the foregoing objects, the invention provides a composite film for bar code labels comprising a first heat-resisting non-water-absorbing synthetic resin film coated on its surface with a synthetic resin paint to which toner easily adheres, after having had plenty of fine particles of silica fixed on the surface, said first film being coated with a heat-resisting adhesive on its back and a second heat-resisting non-water-absorbing synthetic resin film coated on its surface with a releasing agent which enables the second film at the surface to adhere releasably to the back of said first film, said second film being coated with an antistatic agent on its back, after having had plenty of fine particles of silica fixed on the back.

As the first and second heat-resisting non-water-absorbing synthetic resin films in the composite film according to the invention, polyester film, polyimido film, polycarbonate film, cellulose-ester film, polyamide film etc. the thickness of which is selected within the range from 30 to 150 micron are used. All of the films have thermal resistance of more than 100° C.

As the synthetic resin paint to which toner easily adheres, polyolefine resin paint, polyacrylic acid resin paint etc., which are dissolved in an organic soluvent comprised of one, two or more than two out of alcohols, ketones, chloronized hydrocarbons etc., are used. The paint is applied in thickness from 1 to 5 micron. It is preferable that surface resistivity of the applied paint after having been dried is within the range from $1 \times 10^8$ to $1 \times 10^{12}$ ohm.

As the fine particles of silica fixed on the surface of the first film, the particles of silica, the size of which preferably is from 0.007 to 0.016 micron, are fixed on the surface by way of being mixed into the foregoing paint so that that paint contains from 0.07 to 6% by weight of silica, or by way of being previously coated with an adhesive such as urethane resin etc. on the surface of the first film.

The first film is coated on its back with an adhesive which has thermal resistance of more than 100° C. such as a known acrylic resin.

The second film is coated on its surface with a releasing agent such as a known silicone resin. The second film has fine particles of silica fixed on its back, said particles having nearly the same volume and size as those of the particles fixed on the surface of the first film.

As the antistatic agent, one, two or more than two kinds of known surface active agent such as anionic surface agent, cationic surface agent, amphoteric surface agent and nonionic surface agent can be used. The agent is applied to the back of the second film after the particles of silica have been fixed with an adhesive such as urethane resin.

The invention will be described in detail according to an embodiment with reference to the accomanying drawing:

The FIGURE is an enlarged fragmentary sectional view of a composite film for bar code labels according to the present invention.

The composite film for bar code labels comprises a first film 1 and a second film 2. The first film 1 comprises a non-water-absorbing polyester film 10 having thermal resistance of more than 100° C. The film 10 has plenty of fine particles 111 of silica fixed on its surface 11 with a polyolefin resin paint 110 which has been applied to the surface 11. The film 10 is coated on its back 12 with an acrylic resin paint 121 having thermal resistance of more than 100° C. The second film 2 comprises a film 20 of the same kind as the film 10. The film 20 is coated on its surface 21 with a releasing agent 211 of silicone resin and has plenty of fine particles 221 of silica, which are the same as those fixed on the surface 11 of the film 10, fixed on its back 22 with a urethane resin adhesive 222, which has been applied to the back 22. The back 22 is further coated with a surface active agent of acrylic acid derivative on the surface 220 of the adhesive.

Accordingly, bar code can be reproduced on the first film of the composite film according to the invention by means of a high speed dry process electrostatic copier on which a specimen of the bar code is mounted. Then, the first film is released from the second film to be affixed to goods.

Since the composite film for bar code labels according to the invention includes the first film which has been coated on its surface with a synthetic resin paint to which toner easily adheres and which has plenty of fine particles of silica fixed on the surface, the toner can adhere to the surface in good condition. Accordingly, the reproduced bar code is bearable for more than three hundred times of recognition by means of an optical mark reader, even though the bar code has reproduced at high speed to the extent of 7000 pieces per hour. Since the composite film for bar code labels according to the invention includes the second film which has plenty of fine particles of silica fixed on the back and is coated with an antistatic agent, the composite film is prevented from being sent out as two or more than two films being superposed when bar code is being reproduced on the composite film.

Furthermore, since the composite film for bar code labels according to the invention comprises the first and second films made from respective heat-resisting non-water-absorbing synthetic resins, the composite film is prevented from being bent because of heat, when bar code is reproduced. Especially, when the first and second films are of the same kind and have the same thermal expansion coefficient, the composite film is perfectly prevented from being bent because of the foregoing heat. In addition, when bar code is reproduced on the composite film according to the invention, it never happens that the adhesive coating on the back of the first film flows out and adheres to the copying drum of the copier. Since the composite film for bar code labels according to the invention does not absorb water, bar code labels made of the composite film can be rapidly cleaned with water, when the bar code labels have been contaminated with dust and so on. The bar code labels never suffer from humidity when they are in use with outdoor goods or exports.

I claim:

1. A composite film for bar code labels comprising a first heat-resistant non-water-absorbing synthetic resin film having a front surface and a back surface, a synthetic resin paint coating the front surface of the first film, the paint being easily adhered to by toner, fine particles of silica fixed on the front surface of the first film, a heat-resistant adhesive coating the back surface of the first film, a second heat-resistant non-water-absorbing synthetic resin film having a front surface and a back surface, a release agent coating the front surface of the second film and contacting the heat-resistant adhesive releasably adhering the first film to the second film, and an antistatic agent coating the back surface of the second film, and fine particles of silica fixed on the back surface of the second film.

2. The composite film for bar code labels of claim 1, the first and second synthetic resin films being polyester film, polyimido film, polycarbonate film, cellulose-ester film, or polyamide film.

3. The composite film for bar code lables of claim 1, the synthetic resin paint being polyolefine resin paint or polyacrylic acid resin paint which has been dissolved in an organic solvent, the organic solvent being alcohol, ketones, or chloronized hydrocarbons.

4. The composite film for bar code labels of claim 1, the heat-resistant adhesive being an acrylic resin.

5. The composite film for bar code labels of claim 1, the release agent being a silicone resin.

6. The composite film for bar code labels of claim 1, the antistatic agent being an anionic surface agent, a cationic surface agent, an amphoteric surface agent or nonionic surface agent.

7. The composite film for bar code labels of claim 1, the fine particles of silica being 0.007 to 0.016 microns in size.

8. A composite film for bar code labels comprising a first heat-resistant non-water-absorbing synthetic resin film having a front surface and a back surface, a synthetic resin paint coating the front surface of the first film, the paint being easily adhered to by toner, fine particles of silica fixed on the front surface of the first film, a heat-resistant adhesive coating the back surface of the first film, a second heat-resistant non-water-absorbing synthetic resin film having a front surface and a back surface, a release agent coating the front surface of the second film and contacting the heat-resistant adhesive releasably adhering the first film to the second film, and an antistatic agent coating the back surface of the second film, and fine particles of silica fixed on the back surface of the second film, the first and second synthetic resin films being polyester film, polyimido film, polycarbonate film, cellulose-ester film, or polyamide film, the synthetic resin paint being polyolefine resin paint or polyacrylic acid resin paint which has been dissolved in an organic solvent, the organic solvent being alcohol, ketones, or chloronized hydrocarbons, the heat-resistant adhesive being an acrylic resin, the release agent being a silicone resin, the antistatic agent being an anionic surface agent, a cationic surface agent, an amphoteric surface agent or nonionic surface agent, and the fine particles of silica being 0.007 to 0.016 microns in size.

* * * * *